Sept. 24, 1963 R. A. PLANTE 3,104,470
GAGE WITH ADJUSTABLE PANTOGRAPH PRELOADING MEANS
Filed Nov. 18, 1960 2 Sheets-Sheet 1
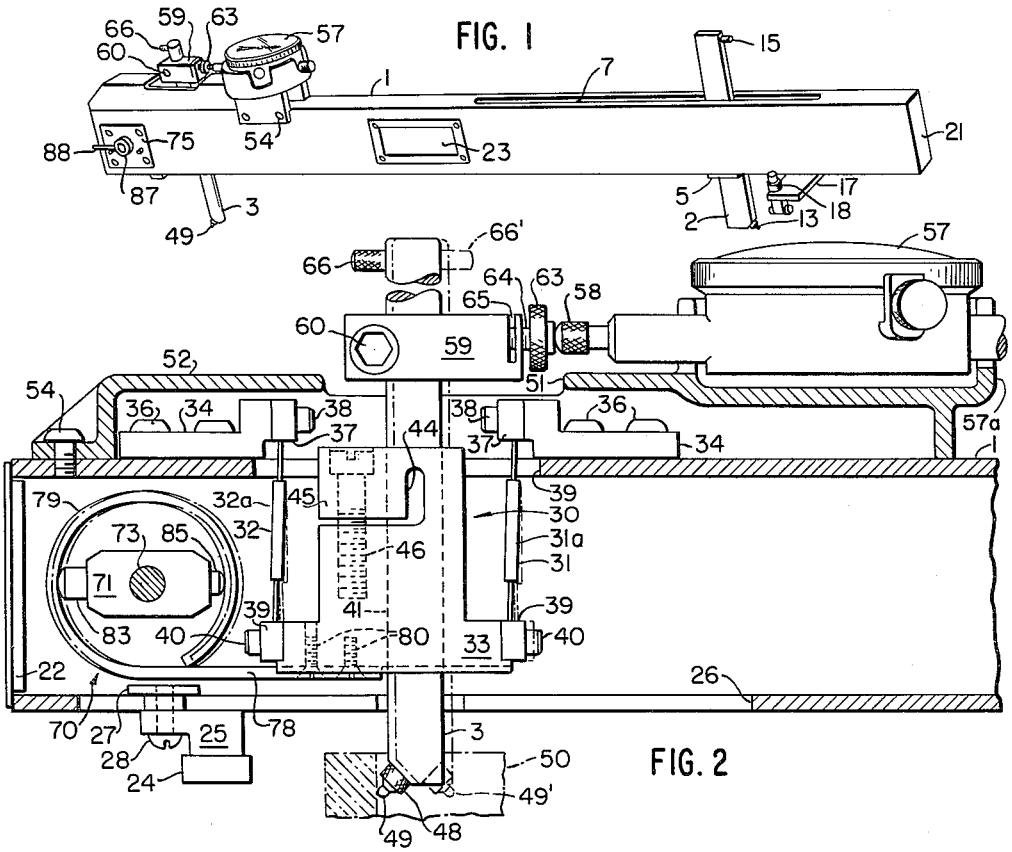
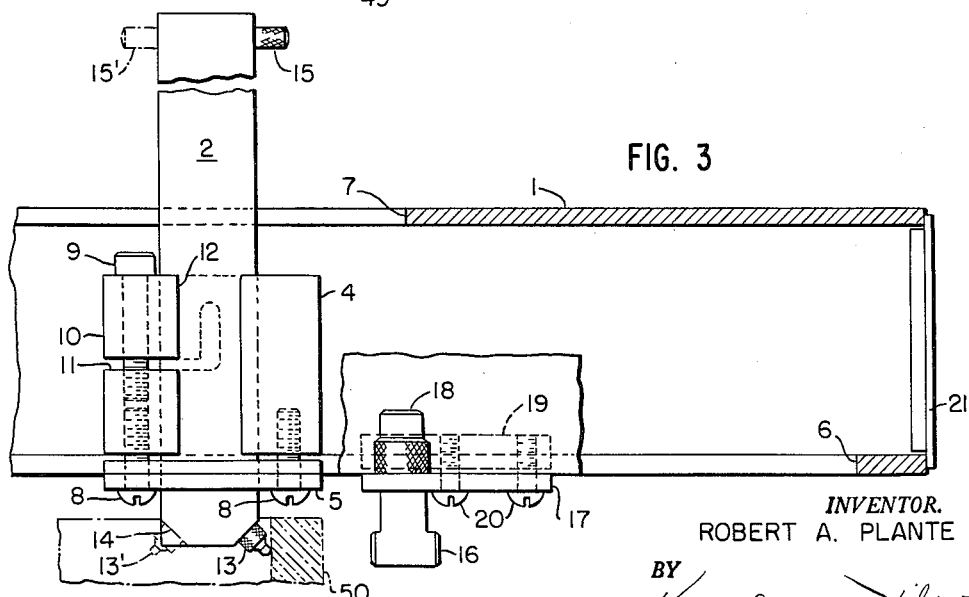
INVENTOR.
ROBERT A. PLANTE
BY
Kenway, Jenney & Hildreth
ATTORNEYS Sept. 24, 1963     R. A. PLANTE     3,104,470
GAGE WITH ADJUSTABLE PANTOGRAPH PRELOADING MEANS
Filed Nov. 18, 1960     2 Sheets-Sheet 2

*INVENTOR.*
ROBERT A. PLANTE
BY
ATTORNEYS

United States Patent Office 3,104,470
Patented Sept. 24, 1963

3,104,470
GAGE WITH ADJUSTABLE PANTOGRAPH
PRELOADING MEANS
Robert A. Plante, Erving, Mass., assignor to The L. S. Starrett Company, Athol, Mass., a corporation of Massachusetts
Filed Nov. 18, 1960, Ser. No. 70,283
6 Claims. (Cl. 33—147)

This invention relates to gages of the type having pantograph reed transfer mechanisms, and more particularly to an improved gage of this type having means for adjustably preloading the reed mechanism.

Gages of the type having a pantograph reed transfer mechanism are in wide use for comparing the dimensions of production parts with a nominal dimension established by a master gage block. Such gages generally comprise a beam carrying a pair of spaced-apart probes, one of which is mounted for adjustment longitudinally of the beam, and the other of which is spaced along the beam and is supported for deflection longitudinally of the beam upon the free ends of parallel spaced-apart flexible reeds, which are fixed at their opposite ends to form a pantograph assembly. The movably supported probe is provided with means engaging a suitable dial indicator or other measuring device from which may be read the deviation of the product dimension from the standard dimension, within tolerance limits. To set the gage to the nominal dimension, it is placed upon a master gage block and the adjustable probes are longitudinally adjusted to engage nibs carried by the probes with surfaces which are preset with the precise nominal spacing upon the master block.

In order to obtain engagement of the nib of the movable probe with surfaces of measured items whose dimensions vary within tolerance limits, it is necessary that the reeds be deflected from the preset nominal dimension position in either longitudinal direction, to engage the surfaces of both undersized and oversized products. The nib will engage the surfaces of items whose dimensions fall between the nominal value and one of the tolerance limits, the reeds being deflected by the engagement, but will not engage the surfaces of items whose dimensions fall in the opposite tolerance range, in the absence of some means for deflecting the reeds. For this reason, the reed assembly is conventionally subjected to a fixed preload in one direction longitudinally of the beam. The reed assembly is deflected to an extent corresponding to the sum of the tolerances, and is returned toward the undeflected position by engagement of the nib with surfaces falling in either of the tolerance ranges. The nib is thus biased into surface engagement with items varying through the entire range of permissible diameter.

Several disadvantages arise from this arrangement. The reeds must be deflected in one direction to an extent corresponding to the sum of the tolerances. However, the reeds have only a limited range in which their movement is substantially linear in a longitudinal direction, since the free ends of the reeds follow an approximately circular path in which the rate of vertical deflection increases with respect to increasing longitudinal deflection. An increase in deflection therefore introduces systematic error at an increasing rate into the measurements. The extremely large deflection inherent in this system results in an undesirably high error within one tolerance range.

The measurement of both inside and outside dimensions by a single gage requires that the direction of preload be reversible, because the reed transfer mechanism must be deflected into engagement with the measured item by the preload in order to gage dimensions in one of the tolerance ranges; this deflection must be made in opposite directions for internal and external measurements. A reed mechanism having a fixed preload must therefore be turned end for end to accomplish this conversion.

Furthermore, the movbale probe changes its longitudinal position with respect to the beam when the gage is transferred from a horizontal to a vertical measuring position, because the weight of the probe is then applied to the reeds longitudinally of the beam. If the gage is oriented so that this weight is opposed to the preload, it may balance and effectively cancel the preload, so that a measurement in the tolerance range extending upwardly from the nominal dimension cannot be obtained. Furthermore, this weight transfer may cause the associated dial indicator to jump, which is believed to be disconcerting to the user of a gage, since it causes him to doubt its reliability.

It is the primary object of this invention to provide an improved gage having a pantograph reed transfer mechanism affording increased accuracy.

It is a further object of the invention to provide an improved gage having a pantograph reed transfer mechanism with means for adapting the gage to both internal and external measurements.

It is still a further object of this invention to provide an improved gage having a pantograph reed transfer mechanism which is relatively stable when the gage is transferred in use from a horizontal to a vertical position.

Briefly stated, in accordance with one embodiment thereof, the invention may be carried out by providing a gage having a pantograph reed transfer mechanism with adjustable preloading means which are reversible to selectively apply a preload to the reed mechanism in opposite directions longitudinally of a beam support, or to remove the preload from the reed mechanism. The gage is provided with a first probe adjustably secured to the beam for longitudinal movement thereon. A second probe is supported for longitudinal movement with respect to the beam by means of a pair of parallel spaced-apart reeds extending transversely to the longitudinal dimension of the beam. The reeds are each secured at one end thereof to the beam, to form a flexible pantograph. Means are provided for transferring longitudinal movement of the probe to a dial indicator, electronic gage, or any other suitable displacement-indicating means.

The pantograph assembly is preloaded adjustably by means of a compression spring which is mounted in a rotatable housing for cooperation with a link secured to the pantograph to bias the reeds. Rotation of the housing through 180° reverses the longitudinal direction of the preload applied to the reeds, and thus adapts the gage for measurement of both inside and outside dimensions. The preload is applied to deflect the reeds in the direction of a minimum tolerance range when the gage is used for outside measurements, and toward a maximum tolerance range when the gage is used for inside measurements. By these means, engagement of the probe with the measured item is obtained in one tolerance range by the preload deflection of the reeds in the direction of that range, and in the opposite tolerance range by the engagement of the probe with the item to deflect the reeds against the bias applied by the preload spring. The reeds will assume an undistorted or vertical position when applied to a part having the nominal dimension. Therefore, in measuring items whose dimensions vary over both tolerance ranges, the reeds are deflected no more than the preload deflection, in either direction longitudinally of the beam. The substantially linear range of response of the transfer mechanism is thus effectively extended, since the linear range of deflection in both directions is utilized. This is distinguished from prior practice in that the linear transfer range in only one longitudinal direction from the undeflected positions of the reeds was previously utilized. This was necessitated by the use of a fixed preload, which required that the reeds be deflected in the same direction from their undeflected positions for measurement in both positive and negative tolerance ranges; that is, through the entire range of measurement. The gage of the present invention is positioned upon the master gage block with the reeds undeflected, so that the nominal dimension is measured with the reeds in an undeflected position; measurement in the opposite tolerance ranges is accompanied by deflection in opposite directions, with the result that the maximum deflection is reduced by half.

The preload-spring housing is provided with a fixed stop which causes the link to limit deflection of the probe in one direction to the preloaded position. The link transmits the weight of the pantograph mechanism and probe to the housing when the gage is turned to a vertical position, either through the fixed stop or through the compression spring, depending upon the orientation of the gage. Random deflection of the reeds and "flip-flop" of the indicator is reduced or eliminated by these means.

While the specification concludes with claims particularly pointing out and distinctly claiming the subject matter which I regard as my invention, it is believed that the invention will be more clearly understood from the following detailed description of a preferred embodiment thereof, referring to the accompanying drawing, in which:

FIG. 1 is a pictorial view of a preferred embodiment of the improved gage;

FIG. 2 is a fragmentary sectional view in elevation of one end of the gage;

FIG. 3 is a similar view of the other end of the gage;

Figure 4:
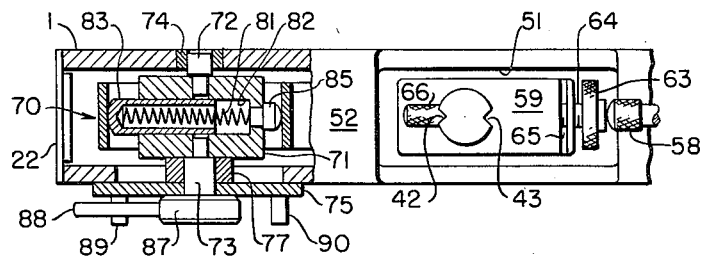
FIG. 4 is a fragmentary plan view, partially in section, of a preloading mechanism forming a portion of the gage.

Referring to the drawings, a preferred embodiment of the improved gage includes a box-section beam 1 upon which are mounted a first probe 2 and a second probe 3. The probe 2 is adjustably mounted for movement longitudinally of the beam by means of a block 4 and a slide 5 having a T-shaped cross section, of which the reduced portion is slidably received in an elongated slot 6 extending in the longitudinal direction. A similar slot 7 is formed in the upper surface of the beam to receive the probe 2 slidably therein. A pair of machine screws 8 pass through the slide 5 and are threaded into the block 4 to secure the probe in an adjusted position in the beam. The probe is also arranged for vertical adjustment in the beam by means of a screw 9 passing through a flexible portion 10, which is formed in the block by a slot 11 and a peripheral discontinuity 12, and threaded into the block to clamp the probe. A nib 13 is secured to a chamfered surface 14 at the lower end of the probe for engaging a measured article, and an auxiliary cylindrical nib 15 is attached to the upper end of the probe. The probe may be reversed end for end for measuring articles to whose surfaces the cylindrical nib is better adapted. The probe is shown in a position for the measurement of outside dimensions in dotted lines, the nibs appearing at 13' and 15'.

A shoe 16 is mounted upon the lower surface of the beam for resting the gage upon a master gage block (not shown) to preset the gage to a precise nominal dimension. The block is secured upon a transverse plate 17, which is provided with knobs, one of which is shown at 18, for convenient manipulation. The plate 17 is adjustably secured in the slot 6 by means of a slide 19 having a T-shaped cross section, of which the reduced portion is slidably received in the slot 6, and a pair of machine screws 20 threaded into the slide. The shoe 16 may also be utilized to locate the nib 13 with respect to a reference surface of the measured article, as may be necessary, for example, with articles having tapered surfaces. The shoe may concurrently check the accuracy of the angle of tapered surface with respect to the article.

The beam is enclosed by means of end plates 21 and 22 cemented in the ends thereof. A tag-receiving frame 23 is secured along the beam for the convenient display of dimensional or other gaging information.

As best shown in FIG. 2, a shoe 24 is provided to perform the same functions as the shoe 16, and is mounted upon the lower surface of the other end of the beam by means of an L-shaped block 25. The shoe 24 is secured in an adjusted position in a longitudinal slot 26 by means of a T-shaped block 27 and a machine screw 28 threaded therein.

The second probe 3 is supported for longitudinal movement in the beam by means of a pantograph reed transfer assembly generally designated 30, which comprises a pair of longitudinally-spaced parallel reeds 31 and 32, and a supporting block 33. The reeds are provided with stiffening plates 31a and 32a, respectively, which are spot-welded upon their central portions. At their upper ends, the reeds are fixedly supported upon the beam by means of a pair of brackets 34. The brackets are secured to the beam by means of machine screws 36, and the reeds are secured thereon by clamps 37 and machine screws 38. The pantograph assembly depends downwardly from the brackets through an opening 39 formed in the upper surface of the hollow beam. At their lower ends the reeds are secured to the block 33 by means of clamps 39 and machine screws 40.

The probe 3 is received in a bore 41 formed in the block, and is reversibly aligned by means of tongue-and-groove means 42 and 43. A slot 44 forms a flexible portion 45 in the block, which is deflected by a machine screw 46 to securely clamp the probe in a vertically adjusted position. The probe is thus mounted for longitudinal movement to engage a surface of the article being measured by flexure of the reeds 31 and 32. The longitudinal slot 26 formed in the beam permits the probe to protrude therefrom. Upon a tapered lower surface 48 thereof, the probe is provided with a nib 49. The nibs 13 and 49 are arranged to engage surfaces of an article 50 to be measured.

The upper end of the probe 3 extends through the opening 39 and through an opening 51 formed in an indicator-mounting bracket 52, which is secured upon the upper surface of the beam by means of a plurality of machine screws 54. A dial indicator 57 is mounted in a suitably formed cup 57a formed in the bracket 52, for the purpose of measuring the deviation from a nominal dimension of the items being measured. A conventional dial indicator is illustrated for purposes of explanation only, and may be replaced by any suitable mechanical or electrical means to measure the longitudinal displacement of the probe 3. The indicator 57 is provided with a button 58 mechanically connected to the indicator to translate longitudinal motion into a dial reading. Means for transmitting longitudinal movement of the probe to the button 58 include a clamp 59, which is adjustably secured to the probe by means of a set screw 60. The clamp is provided with a button 63, having a stem 64 threaded into the clamp. The stem traverses a saw-cut 65, which is bent slightly to bias the button in an adjusted position in the clamp. Longitudinal movement of the probe is thus transmitted by the button 63 to the dial indicator 57. At its upper end, the probe is provided with an auxiliary nib 66 similar in function to the nib 15. The probe may be reversed for use in measuring outside dimensions by releasing the probe from the block 33 and the clamp 59, turning the probe 180°, and reclamping the block and clamp upon the probe. In the reversed position, the nibs are shown in dotted lines at 49' and 66', respectively.

In order to measure items whose dimensions range from a nominal value through positive and negative tolerance ranges, it is necessary to preload the pantograph assembly in one longitudinal direction. In the case of inside measurements, for which the probes 2 and 3 are arranged in the drawing, the pantograph is preloaded in the direction of the maximum tolerance range by means of an adjustable preload mechanism generally designated 70. The preload mechanism is adjustable to selectively remove the preload from the pantograph, or to apply a preload in either longitudinal direction for the measurement of inside and outside dimensions. The preload mechanism includes a preload spring housing 71, which is rotatably mounted about an axis transverse to the beam by means of cylindrical pins 72 and 73 press-fitted into the housing. The pin 72 is rotatably supported in a bushing 74 press-fitted into the beam, while the pin 73 is rotatably supported in a plate 75 secured to a surface of the beam by means of a plurality of screws 76. A bushing 77 is interposed between the plate 75 and the housing 71 to space the housing from the plate.

A link 78 having a circular loop 79 formed therein is secured to the lower surface of the block 33 by means of a pair of machine screws 80. A compression-type preload spring 81 is received within a bore 82 formed through the housing 71 diametrically of the rotational axis thereof, and biases a hollow plunger 83 radially of the axis against the interior surface of the loop 79. A stop pin 85 is press-fitted into the housing along the axis of the plunger, and diametrically opposite thereto, to limit movement of the link 78. The housing 71 is arranged for rotation to selectively reverse the longitudinal direction in which preload is applied to the reed assembly by the spring 81, or to relieve the reed assembly of preload for purposes of setting the gage to a nominal dimension. A ring 87 is secured upon the end of the pin 73, and a handle 88 is press-fitted diametrically through the ring and pin to provide a convenient means for manually adjusting the preloading mechanism. The handle 88 is rotatable through 180°, stop pins 89 and 90 being press-fitted into the plate 75 to limit the motion.

Figure 5:
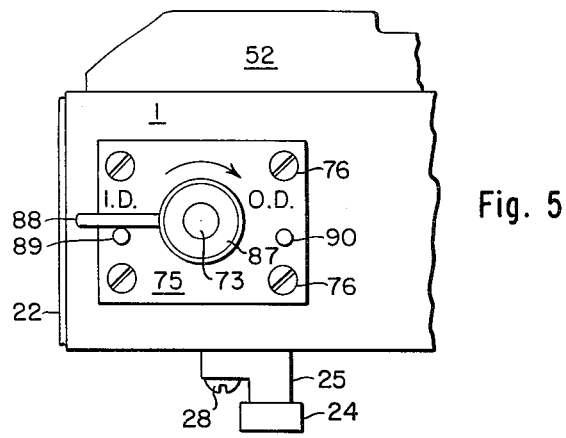
FIG. 5 is a fragmentary view in elevation.

In the position of the reed assembly and preloading mechanism shown in full lines in the drawing, the reed assembly is preloaded for the measurement of internal dimensions. The position of the parts when relieved of longitudinal preload is shown in dashed lines in FIG. 2. In order to measure outside dimensions, the handle 88 is turned to the position labelled O.D. in FIG. 5, in which the reed assembly is preloaded in a longitudinal direction to the right as viewed in FIG. 2. The probes 2 and 3 are also reversed in longitudinal direction.

Figure 6:
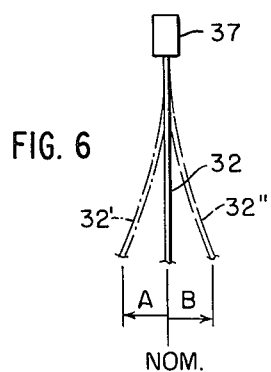
FIG. 6 is a diagrammatic view of a reed forming a portion of the pantograph assembly, illustrating the deflectional movements of the reed.

The operation of the preloading mechanism will be more fully understood by reference to the schematic illustration of FIG. 6. The reed 32 is shown in full lines in an undeflected position corresponding to the nominal dimension, and in dotted lines at 32' and 32" in positions corresponding to the positive and negative tolerance limits. Depending upon whether inside or outside dimensions are to be measured, the reed is preloaded and deflected to the position 32' or 32", respectively. As a practical matter, the reeds are preloaded somewhat beyond the positions corresponding to the appropriate tolerance limits, but this is unnecessary other than for the purpose of achieving adaptability of the gage to various tolerance limits. The preload is thus applied in either of the directions indicated by the arrows A or B.

If it is assumed, for example, that the preload A is applied for the measurement of inside dimensions, the reed will deflect toward the position 32' in measuring items falling within the positive tolerance range, the nib being engaged with the surface of the measured item through the bias of the preload spring 81. Deflection of the reed through the positive tolerance range is thus achieved against the bias of the preload spring, and through the minimum tolerance range (to the right of the undeflected position, as viewed in FIG. 6) against the bias of the preload spring and the reeds. The entire deflection of the reeds is centered about an undeflected or vertical position, and the substantially linear deflection range of the reed is utilized to a maximum extent.

Figure 7:
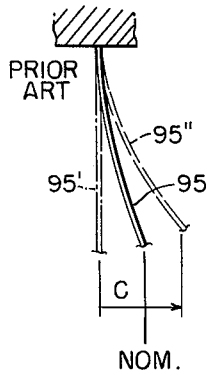
FIG. 7 is a diagrammatic view of a reed subjected to a fixed preload according to the prior art, showing the deflectional movements of the reed.

Referring to FIG. 7, a reed subjected to a fixed preload represented by the arrow C, according to the prior art, is illustrated for the purpose of clarifying the invention. A reed 95 is preloaded to the position shown at 95", and the nominal dimension corresponds to the deflected position shown in solid lines. In measuring an object having a dimension corresponding to one extreme tolerance limit, the spring is returned to the undeflected or vertical position 95'. However, in measuring objects whose dimension falls in the opposite tolerance range, the reed is further deflected by the preload toward the position 95". In order to measure objects within both positive and negative tolerance ranges, therefore, the reed is deflected twice as far in one direction as the reed of the present invention. The linear response range to the left of the vertical, as viewed in FIG. 7, is not utilized. Therefore, the maximum utilization of the linear response range achieved by the present invention cannot be provided by a pantograph mechanism having a fixed preload.

In utilizing the improved gage, the dial indicator is first set to a zero reading with no preload applied to the pantograph. The preload is then applied in a direction corresponding to inside or outside measurements, as desired. The gage is positioned upon a conventional master gage block, having reference surfaces preset precisely to the desired nominal dimension. The probes are adjusted longitudinally to a position in which the dial indicator again registers zero deflection, which establishes the reeds in an undeflected or vertical position to correspond to the nominal dimension. The gage is then removed and employed in a conventional manner to measure production items; the dial indicator, or other desired form of indicating means, displays the deviation of the items from the nominal dimension.

When the gage of the present invention is hand manipulated from a horizontal to a vertical position, the weight of the pantograph reed assembly is supported either by the preload spring 81, or by the stop pin 85, depending upon the vertical orientation of the gage. Thus, the disturbance of the dial indicator which would occur if the weight were entirely supported by the reeds is eliminated or substantially reduced.

While a preferred embodiment of the invention has been illustrated and described, it will be evident to those skilled in the art that various changes and modifications may be made without departing from the spirit and scope of the invention. It is therefore intended to cover all such changes and modifications in the appended claims.

The invention having thus been disclosed, what is claimed as new and desired to be secured by Letters Patent of the United States is:

1. In a gage for the measurement of length, a longitudinally-extending beam, a first probe adjustably secured to said beam, a pantograph reed assembly mounted for longitudinal flexural movement upon said beam, a second probe supported in said reed assembly for longitudinal movement therewith, and adjustable preloading means including a spring, linkage means drivingly connected with said reed assembly, and spring housing means supporting said spring rotatably on said beam to selectively transmit the bias of said spring through said linkage means to said reed assembly in either longitudinal direction along said beam to preload said reed assembly.

2. In a gage for the measurement of length, a longitudinally extending beam, a first probe adjustably secured to said beam, a pantograph reed assembly mounted for longitudinal flexural movement upon said beam, a second probe supported in said reed assembly for longitudinal movement therewith, linkage means drivingly connected with said reed assembly, a spring, and a spring housing receiving said spring and cooperating with said linkage means to deflect said spring elastically, said spring housing being mounted for rotation on a portion of said beam to a first position in which said spring preloads said reed assembly in one direction longitudinal of said beam and to a second position in which said spring preloads said reed assembly in an opposite direction longitudinal of said beam.

3. A gage as recited in claim 2, in which said spring housing is rotatable to a third position relieving said reed assembly of preload longitudinal of said beam.

4. In a gage for the measurement of length, a longitudinally extending beam, a first probe adjustably secured to said beam, a pantograph reed assembly including a pair of reeds spaced apart longitudinally of said beam and each secured at first ends thereof to said beam, said reeds extending in an undeflected condition thereof perpendicularly to the longitudinal dimension of said beam, a second probe supported by second ends of said reeds for longitudinal movement therewith upon flexure of said reeds, a link drivingly connected with said second ends of said reeds, said link formed with a loop, a spring, and a spring housing disposed within said loop and supporting said spring for biasing said loop, said spring housing being mounted on a portion of said beam for rotation about an axis transverse thereto to selectively vary the direction of bias of said link by said spring to selectively preload said reeds in either direction longitudinally of said beam.

5. A gage as recited in claim 4, together with a stop pin mounted on said housing and engaging said loop to limit movement thereof in the direction of bias by said spring.

6. A gage as recited in claim 4, in which said spring housing is selectively rotatable to positions in which said reeds are relieved of bias by said spring longitudinally of said beam.

References Cited in the file of this patent
UNITED STATES PATENTS
2,412,421    Polk et al. _____ Dec. 10, 1946